United States Patent
Matsuda (10) Patent No.: US 10,084,952 B2
(45) Date of Patent: Sep. 25, 2018

(54) COMMUNICATION APPARATUS WIRELESSLY COMMUNICATING WITH EXTERNAL APPARATUS, CONTROL METHOD OF COMMUNICATION APPARATUS, AND STORAGE MEDIUM

(71) Applicant: CANON KABUSHIKI KAISHA, Tokyo (JP)

(72) Inventor: Jun Matsuda, Kanazawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/593,151

(22) Filed: May 11, 2017

(65) Prior Publication Data
US 2017/0353651 A1 Dec. 7, 2017

(30) Foreign Application Priority Data

Jun. 1, 2016 (JP) .................. 2016-110351

(51) Int. Cl.
| | |
|---|---|
| H04N 5/222 | (2006.01) |
| H04N 5/232 | (2006.01) |
| H04B 7/26 | (2006.01) |
| H04N 5/235 | (2006.01) |

(52) U.S. Cl.
CPC ........... *H04N 5/23203* (2013.01); *H04B 7/26* (2013.01); *H04N 5/2353* (2013.01); *H04N 5/23212* (2013.01); *H04N 5/23216* (2013.01); *H04N 5/23293* (2013.01)

(58) Field of Classification Search
CPC ............... H04N 5/232; H04N 5/23245; H04N 5/23203; H04N 5/23206; H04N 5/23293; H04N 5/2353; H04N 5/23216; H04N 5/23212; H04N 1/00411; H04N 1/00408; H04N 1/00477; G03B 17/20
See application file for complete search history.

(56) References Cited

U.S. PATENT DOCUMENTS

| | | | |
|---|---|---|---|
| 2005/0055727 A1* | 3/2005 | Creamer ............ | H04N 1/00214 725/105 |
| 2006/0066725 A1* | 3/2006 | Dodrill .................. | H04N 5/232 348/207.99 |
| 2013/0287382 A1* | 10/2013 | Xiao .................. | H04N 5/23203 396/59 |
| 2014/0028875 A1* | 1/2014 | Hara ........................ | H04N 5/77 348/231.5 |

(Continued)

*Primary Examiner* — Kelly L Jerabek
(74) *Attorney, Agent, or Firm* — Canon U.S.A., Inc. IP Division (57) ABSTRACT

A communication apparatus includes a setting unit that sets a time interval with respect to a timing of communicating with an external apparatus, a communication unit that communicates with the external apparatus at the time interval, and a control unit that performs control to, based on a request of the operation through the remote operation received from the external apparatus, communicate with the external apparatus in one of a plurality of modes including a remotely operated mode in which an operation corresponding to a requested operation is executed, wherein, in a case where a mode is shifted to the remotely operated mode, the setting unit changes the time interval to a shorter interval, and the control unit performs control to notify a user that the time interval is a long interval until a change of the time interval is completed.

19 Claims, 6 Drawing Sheets

(56) References Cited

U.S. PATENT DOCUMENTS

| | | |
|---|---|---|
| 2014/0039804 A1 | 2/2014 | Park |
| 2016/0127626 A1* | 5/2016 | Horigome .............. H04N 7/181 348/159 |
| 2016/0182803 A1* | 6/2016 | Song .................. H04N 5/23206 348/211.2 |
| 2017/0310875 A1* | 10/2017 | Kiso ...................... H04N 5/232 |

* cited by examiner

COMMUNICATION APPARATUS WIRELESSLY COMMUNICATING WITH EXTERNAL APPARATUS, CONTROL METHOD OF COMMUNICATION APPARATUS, AND STORAGE MEDIUM

BACKGROUND

Field

The present disclosure relates to a communication apparatus wirelessly communicating with an external apparatus, a control method of the communication apparatus, and a storage medium.

Description of the Related Art

In recent years, a wireless communication function has been installed in portable devices such as mobile phones or digital cameras. A communication standard such as the Bluetooth® Low Energy, which is intended to reduce the power consumption, has appeared in the wireless communication technical field. For example, U.S. Patent Application Publication No. 2014/0039804 discusses a technique of changing an interval of data transmission/reception (i.e., connection interval (CI)) in the communication using Bluetooth® Low Energy according to an operation mode of a device.

According to the Bluetooth® Low Energy standard, even if a change of the CI is requested, the device cannot change the CI instantly. Therefore, when the CI of a short interval is required, as in the case of operating a device from an external apparatus through a remote operation, there is a risk in which the device cannot be operated by the remote operation based on an intention of the user until the CI is changed.

The CI is desirably shorter in a digital camera because a shutter timing is important. However, since it takes a predetermined time until the CI is shortened, there is a possibility that a user operates a digital camera before the CI is shortened. In this case, the user cannot release the shutter at an intended timing.

SUMMARY

According to an aspect of an embodiment, a communication apparatus that communicates with an external apparatus to accept a remote operation from the external apparatus includes a setting unit configured to set a time interval with respect to a timing of communicating with the external apparatus, a communication unit configured to communicate with the external apparatus at the time interval set by the setting unit, and a control unit configured to perform control to, based on an operation request through the remote operation received from the external apparatus, communicate with the external apparatus in one of a plurality of modes including a remotely operated mode in which an operation corresponding to the operation request is executed, wherein, in a case where a mode is shifted to the remotely operated mode, the setting unit changes the time interval to a shorter interval, and the control unit performs control to notify a user that the time interval is a long interval until a change of the time interval is completed.

Further features will become apparent from the following description of exemplary embodiments with reference to the attached drawings.

DESCRIPTION OF THE EMBODIMENTS

Hereinafter, exemplary embodiments will be described in detail with reference to the appended drawings. In addition, the exemplary embodiments described below are not seen to be limiting, and can be modified or changed as appropriate according to a configuration or various conditions of any applicable apparatus. Each exemplary embodiment can be combined as appropriate.

<Configuration of Communication Apparatus>

Figure 1A:
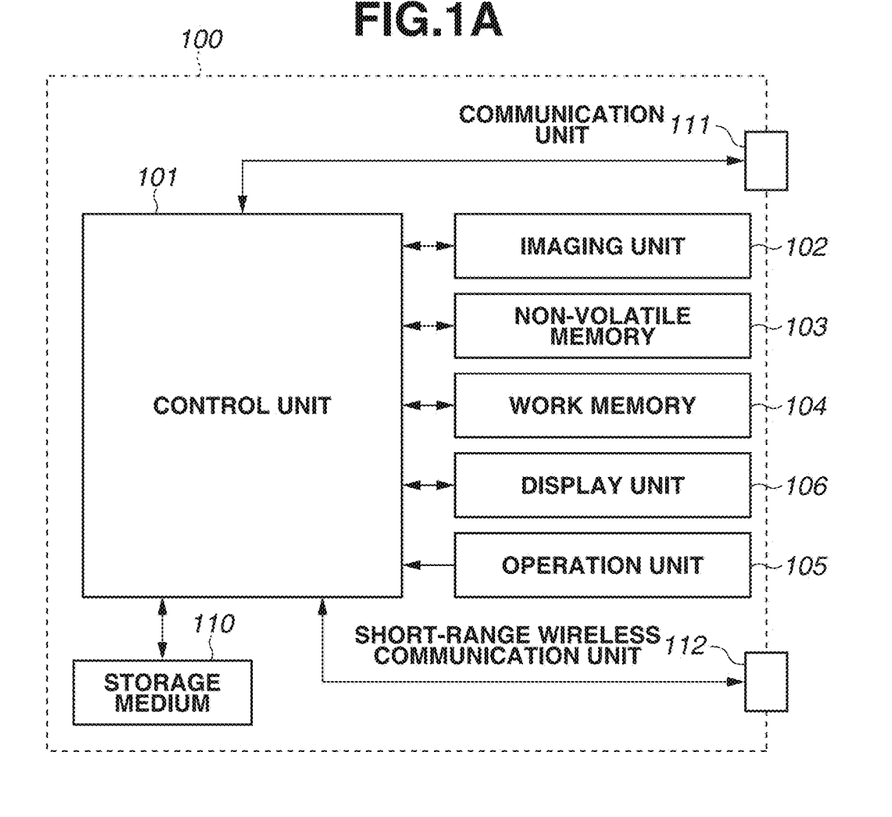
FIG. 1A is a block diagram illustrating a configuration example of a communication apparatus according to an exemplary embodiment.

First, a configuration example of a communication apparatus in the present exemplary embodiment will be described. FIG. 1A is a block diagram illustrating a configuration example of a digital camera as an imaging apparatus that is as an example of a communication apparatus 100 in the present exemplary embodiment. In the present exemplary embodiment described below, while a digital camera is described as the communication apparatus 100, an exemplary embodiment of the communication apparatus 100 is not limited to the digital camera. For example, the communication apparatus 100 can be an arbitrary information processing apparatus or imaging apparatus, such as a personal computer, a mobile phone, a smartphone, a personal digital assistance (PDA), a tablet device, a digital video camera, or a portable media player, which has an imaging function or a playback function. Hereinafter, a configuration of the communication apparatus 100 (also referred to as "digital camera 100") will be specifically described with reference to FIG. 1A.

A control unit 101 controls the units of the digital camera 100 based on a signal input thereto or a program described below. In addition, a plurality of pieces of hardware can share the processing to control the digital camera 100 instead of just the control unit 101 controlling the digital camera 100.

An imaging unit 102 is configured to include an optical lens unit, an optical system for controlling an aperture, a zoom, and a focus thereof, and an image sensor for converting light (video image) introduced thereto via the optical lens unit into an electric video signal. Generally, a complementary metal oxide semiconductor (CMOS) image sensor or a charge coupled device (CCD) image sensor is used as the image sensor. The imaging unit 102 is controlled by the control unit 101, so as to convert object light that is formed into an image through a lens included in the imaging unit 102 into an electric signal by the image sensor, perform noise reduction processing thereon, and output digital data as image data.

In the present exemplary embodiment, a series of processing for acquiring and outputting image data is referred to as "imaging". In the digital camera 100 of the present exemplary embodiment, the image data is stored in a storage medium 110 according to a standard of a design rule for camera file system (DCF). In the present exemplary embodiment, the imaging unit 102 is included as an element of the digital camera 100 because the communication apparatus 100 is described as the digital camera 100. In a configuration where the communication apparatus 100 is not a digital camera, it does not have to include the imaging unit 102.

A non-volatile memory 103 is an electrically erasable/recordable non-volatile memory, and a below-described program executed by the control unit 101 is stored therein. A work memory 104 is used as a buffer memory for temporarily retaining image data acquired by the imaging unit 102, an image display memory of a display unit 106, or a work area of the control unit 101.

An operation unit 105 is a user interface for accepting an instruction with respect to the digital camera 100 from a user. For example, the operation unit 105 includes a power button (not illustrated), a release switch 105a, and a playback button 105b, which enable a user to provide respective instructions of turning on or off the power, executing imaging, and replaying image data to the digital camera 100. The operation unit 105 can also include an operation member, such as a dedicated connection button (not illustrated), for starting communication with an external apparatus via a short-range wireless communication unit 112. A touch panel formed on the display unit 106 can also be included in the operation unit 105. In addition, the release switch includes switches SW1 and SW2 (not illustrated).

When the release switch is brought into an half-pressed state, the switch SW1 is turned on. In this state, the operation unit 105 accepts an instruction for executing imaging preparations such as auto-focus (AF) processing, auto-exposure (AE) processing, auto-white balance (AWB) processing and pre-flash (EF) processing. When the release switch is brought into a full-pressed state, the switch SW2 is turned on. In this state, the operation unit 105 accepts an instruction for executing imaging.

The display unit 106 executes display of a view finder image when executing imaging, acquired image data, or characters for executing an interactive operation. The display unit 106 does not have to be built into the digital camera 100 but can be connected to the digital camera 100. The digital camera 100 can have at least a display control function that enables the digital camera 100 to connect to an internal or an external display unit 106 to execute display control of the display unit 106. The storage medium 110 can store image data output from the imaging unit 102. The storage medium 110 can be detachably attached to the digital camera 100, or can be built into the digital camera 100. The digital camera 100 can include at least a unit for accessing the storage medium 110.

A communication unit 111 is an interface for connecting to the external apparatus. The digital camera 100 in the present exemplary embodiment can transmit and receive data to/from the external apparatus via the communication unit 111. For example, image data generated by the imaging unit 102 can be transmitted to the external apparatus via the communication unit 111. In the present exemplary embodiment, the communication unit 111 includes an interface for communicating with the external apparatus through a wireless local area network (LAN) compliant with the Institute of Electrical and Electronics Engineers (IEEE) 802.11 standard. The control unit 101 controls the communication unit 111 to realize wireless communication with the external apparatus. A communication method is not limited to the wireless LAN, and an infrared communication method can be employed. The communication unit 111 is an example of a first wireless communication unit.

The short-range wireless communication unit 112 includes an antenna for executing wireless communication, a modulation/demodulation circuit for processing a wireless signal, and a communication controller. The short-range wireless communication unit 112 outputs a modulated wireless signal from the antenna and demodulates a wireless signal received through the antenna, so as to realize short-range wireless communication with the external apparatus according to the IEEE 802.15 standard (known as Bluetooth®). In the present exemplary embodiment, Bluetooth® Low Energy version 4.0 with low-power consumption is employed as the Bluetooth® communication. A communicable range of the Bluetooth® Low Energy communication is smaller (i.e., a communicable distance thereof is shorter) and a communication speed thereof is lower than those of the wireless LAN communication. Power consumption of the Bluetooth® Low Energy communication is lower than that of the wireless LAN communication.

In the present exemplary embodiment, the communication speed of the communication realized by the communication unit 111 is higher than the communication speed of the communication realized by the short-range wireless communication unit 112. The communicable range of the communication realized by the communication unit 111 is greater than that of the communication realized by the short-range wireless communication unit 112.

The communication unit 111 can be operated in an access point (AP) mode for operating as an access point in an infrastructure mode and a client (CL) mode for operating as a client in the infrastructure mode. The digital camera 100 operates as a CL device in the infrastructure mode when the communication unit 111 operates in the CL mode. When the communication unit 111 operates in the AP mode, the digital camera 100 can operate as a type of access point called "simplified AP" with a limited function.

Figure 1B:
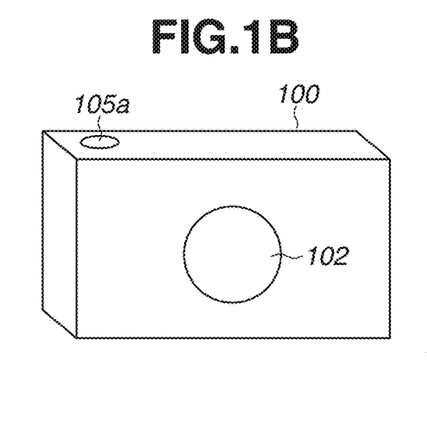
FIGS. 1B and 1C are diagrams each illustrating an example of an external view of a digital camera as one embodiment of the communication apparatus.
Figure 1C:
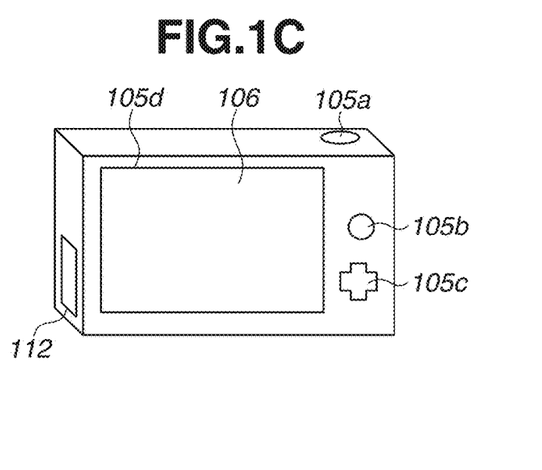

An external view of the digital camera 100 will now be described. FIGS. 1B and 1C are diagrams illustrating an example of the external view of the digital camera 100. A release switch 105a, a playback button 105b, a direction key 105c, and a touch panel 105d are operation members included in the operation unit 105. An image acquired as a result of imaging executed by the imaging unit 102 is displayed on the display unit 106. The digital camera 100 of the present exemplary embodiment includes an antenna portion of the short-range wireless communication unit 112 on a side face of the camera housing thereof.

<Configuration of Information Processing Apparatus>

Figure 2:
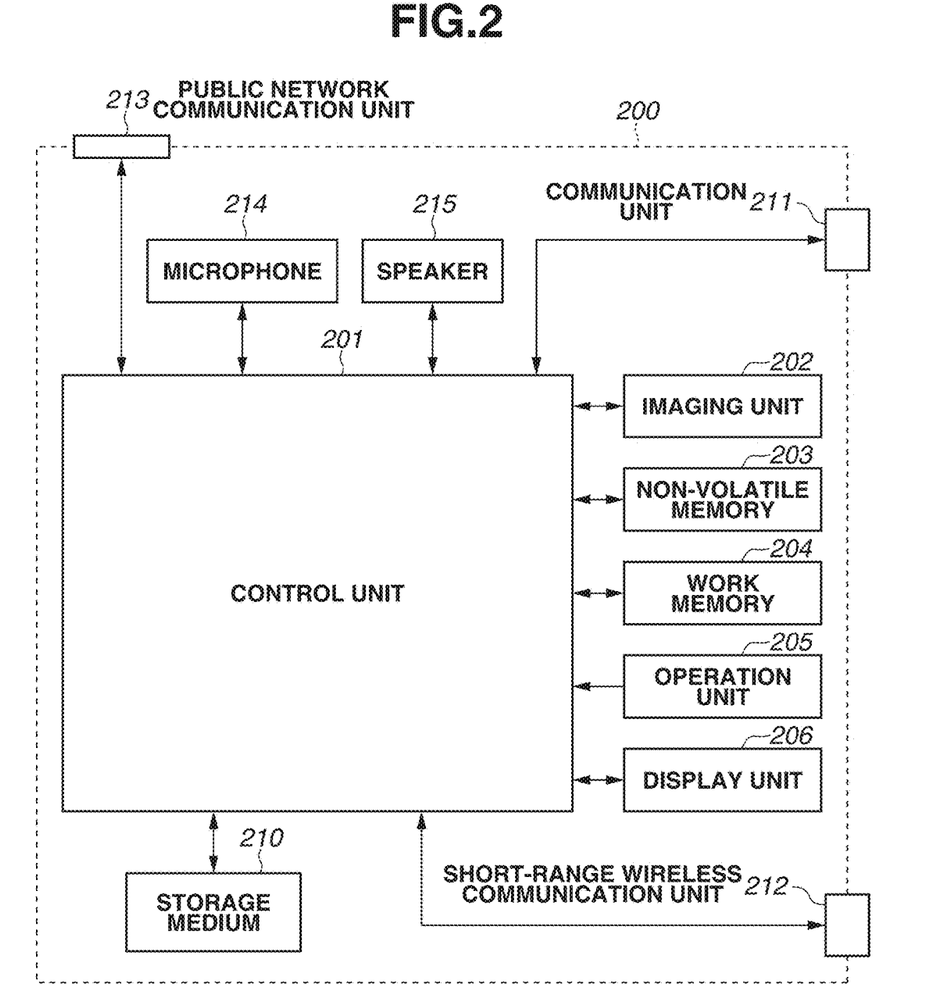
FIG. 2 is a block diagram illustrating a configuration example of an information processing apparatus according to the exemplary embodiment.

Next, a configuration example of an information processing apparatus as an external apparatus communicating with the digital camera 100 will be described. FIG. 2 is a block diagram illustrating a configuration example of a mobile phone as an example of an information processing apparatus 200 in the present exemplary embodiment. In the present exemplary embodiment, while a mobile phone is used as an example of the information processing apparatus 200, this example is not seen to be limiting. For example, the information processing apparatus 200 can be an arbitrary information processing apparatus or remote control apparatus, e.g., a digital camera, a smartphone, a PDA, a tablet device, a digital video camera, a portable media player, or a remote controller. Hereinafter, a configuration of the mobile phone 200 will be specifically described with reference to FIG. 2.

A control unit 201 controls each unit of the mobile phone 200 based on a signal input thereto or a program described below. In addition, a plurality of pieces of hardware can share the processing to control the mobile phone 200 instead of just the control unit 201 controlling the mobile phone 200. The imaging unit 202 converts object light formed into an image through a lens included in the imaging unit 202 into an electric signal, performs noise reduction processing thereon, and outputs digital data as image data. After the acquired image data is stored in a buffer memory, the control unit 201 executes predetermined arithmetic processing and stores the image data in a storage medium 210.

A non-volatile memory 203 is an electrically erasable/recordable non-volatile memory. An operating system (OS) as basic software executed by the control unit 201 and an application cooperatively operating with the OS to realize an applicative function are stored in the non-volatile memory 203. In the present exemplary embodiment, an application for communicating with the digital camera 100 is stored in the non-volatile memory 203. A work memory 204 is used as an image display memory of the display unit 206 or a work area of the control unit 201.

An operation unit 205 is used for accepting an instruction with respect to the mobile phone 200 from the user. For example, the operation unit 205 includes operation members such as a power button (not illustrated) that enables a user to provide an instruction for turning on or off the power of the mobile phone 200 and a touch panel (not illustrated) formed on the display unit 206. The display unit 206 executes display of image data or characters for executing an interactive operation. The display unit 206 does not have to be included in the mobile phone 200. The configuration can be any configuration if the mobile phone 200 includes at least a display control function enabling the mobile phone 200 to connect to the display unit 206 to execute display control of the display unit 206.

The storage medium 210 can store image data output from the imaging unit 202. The storage medium 210 can be detachably attached to the mobile phone 200, or can be integrated into the mobile phone 200. The mobile phone 200 can have any configuration as long as it includes at least a unit for accessing the storage medium 210.

A communication unit 211 is an interface for connecting to the external apparatus. The mobile phone 200 in the present exemplary embodiment can transmit and receive data to/from the digital camera 100 via the communication unit 211 and the communication unit 111 of the digital camera 100. In the present exemplary embodiment, the communication unit 211 serves as an antenna, so that the control unit 201 can connect to the digital camera 100 via the antenna. In addition, the mobile phone 200 can directly connect to the digital camera 100, or can connect thereto via an access point. For example, a picture transfer protocol over internet protocol (PTP/IP) can be used as a protocol for executing data communication through the wireless LAN. Communication with the digital camera 100 is not limited to the communication using the above protocol. For example, the communication unit 211 can employ a wireless communication module such as an infrared communication module or a wireless universal serial bus (USB).

The short-range wireless communication unit 212 realizes non-contact near field communication with another apparatus, such as the communication apparatus 100. The short-range wireless communication unit 212 includes an antenna for executing wireless communication, a modulation/demodulation circuit for processing a wireless signal, and a communication controller. The short-range wireless communication unit 212 outputs a modulated wireless signal from the antenna and demodulates a wireless signal received through the antenna, so as to realize near field wireless communication with the communication apparatus 100 as the external apparatus according to the Bluetooth® Low Energy version 4.0 described above.

A public network communication unit 213 is an interface used for executing public wireless communication. The user can use the mobile phone 200 to make a call to another device via the public network communication unit 213. At this time, the control unit 201 inputs and outputs an audio signal via a microphone 214 and a speaker 215 to realize a call. In the present exemplary embodiment, the public network communication unit 213 serves as an antenna, so that the control unit 201 can connect to the public network via the antenna. In addition, just one antenna can be used for both of the communication unit 211 and the public network communication unit 213.

<Remote Operation (Remote Control)>

Figure 3A:
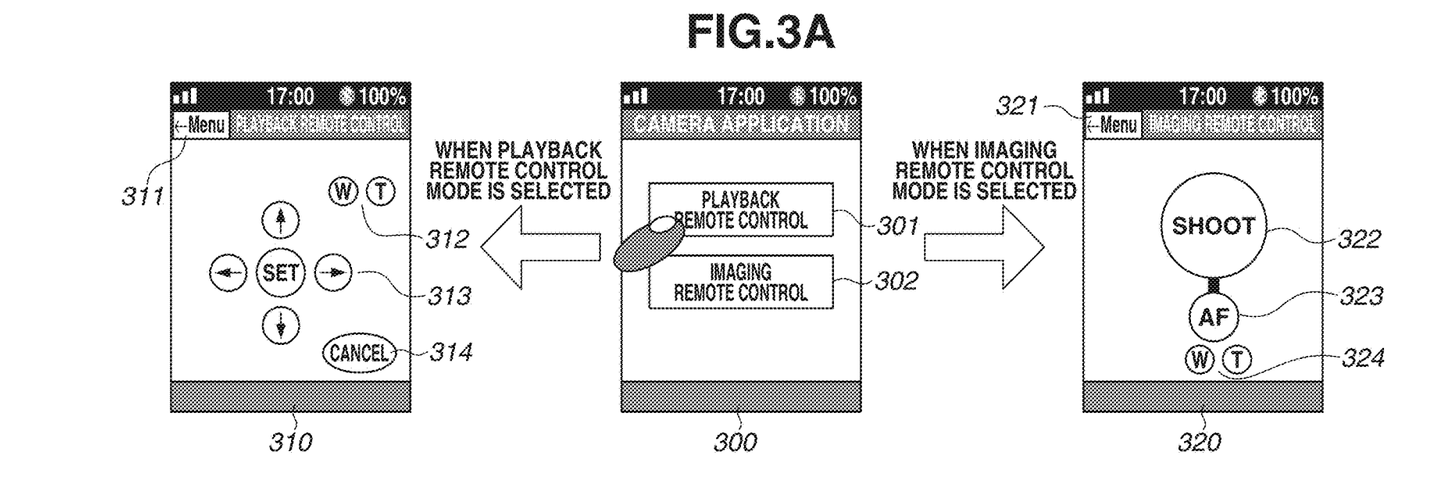
FIG. 3A is a diagram illustrating examples of screens displayed on the information processing apparatus according to the exemplary embodiment.
Figure 3B:
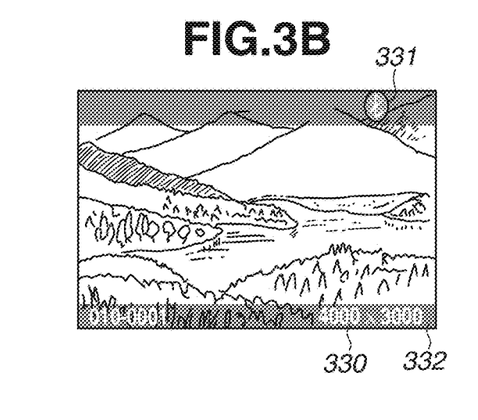
FIGS. 3B and 3C are diagrams illustrating examples of screens displayed on the communication apparatus according to the exemplary embodiment.

In the present exemplary embodiment, a remote operation (remote control) of the digital camera 100 can be executed through an application installed in the mobile phone 200. Hereinafter, description will be provided with respect to examples of screens displayed on the digital camera 100 and the mobile phone 200 when the digital camera 100 is remotely operated by the mobile phone 200. FIGS. 3A and 3B are diagrams respectively illustrating examples of graphical user interface (GUI) screens of the mobile phone 200 and the digital camera 100.

First, a screen 300 in FIG. 3A is an illustrative GUI screen of the application executed by the mobile phone 200, which is displayed on the display unit 206 when the user remotely operates the digital camera 100 through the mobile phone 200. The screen 300 includes a playback remote control button 301 and an imaging remote control button 302. The user of the mobile phone 200 can select the button 301 or 302 via the operation unit 205 (e.g., a touch panel) by tapping a surface of the touch panel at a display position of the button 301 or 302. A screen 310 is an example of the screen displayed on the display unit 206 of the mobile phone 200 when the playback remote control button 301 is selected from the screen 300. A plurality of operation buttons is displayed on the screen 310. The operation buttons include a menu button 311 for returning to the screen 300, a scaling button 312 for enlarging or reducing a replayed image, up/down/right/left selection buttons 313 for selecting an image to be replayed, and a cancel button 314 for cancelling the operation. The above operation buttons correspond to the operation function provided by the operation unit 105 in the playback mode of the digital camera 100. Therefore, by operating these operation buttons, the user can perform the operation equivalent to the operation directly performed on the operation unit 105 of the digital camera 100.

A screen 320 is an example of the screen displayed on the display unit 206 when the imaging remote control button 302 is selected on the screen 300. A plurality of operation buttons is displayed on the screen 320. The operation buttons include a menu button 321 for returning to the screen 300, an imaging button 322 corresponding to the switch SW2 of the release switch 105a, an AF button 323 corresponding to the switch SW1 of the release switch 105a, and a zoom button 324 for controlling zooming. The above operation buttons correspond to the operation functions provided by the operation unit 105 in the imaging mode of the digital camera 100. Therefore, by operating these operation buttons, the user can perform operations equivalent to the operations directly performed on the operation unit 105 of the digital camera 100.

The screens 300, 310, and 320 illustrated in FIG. 3A are examples of the screens displayed on the mobile phone 200. The number and types of operation buttons included in the respective screens are not limited to those described in the present exemplary embodiment. In the screen 310 or 320, a button that does not exist in the digital camera 100 can be virtually displayed. For example, a slide-show button for changing a displayed image at a predetermined timing can be provided on the playback remote control button 301. Further, an oblique direction button can be provided in addition to the up/down/right/left selection buttons 313.

A screen 330 in FIG. 3B is an example of the GUI screen displayed on the display unit 106 in a playback remote control mode of the digital camera 100. The screen 330 is displayed when the replay remote control button 301 is selected at the mobile phone 200 so that the digital camera 100 is operated in the playback remote control mode. When the digital camera 100 and the mobile phone 200 are connected through the Bluetooth® (i.e., execute Bluetooth® Low Energy communication), a mark 331 indicating a Bluetooth® connection state is displayed on the screen 330. With this configuration, the user can recognize that the digital camera 100 and the mobile phone 200 are connected through the Bluetooth®. Image detail information 332 is included in the screen 330, so that the user can recognize the information associated with the image. While the current example only refers to displaying an image number and a resolution of the image, additional items such as a date, global positioning system (GPS) information, or a histogram can also be displayed.

Figure 3C:
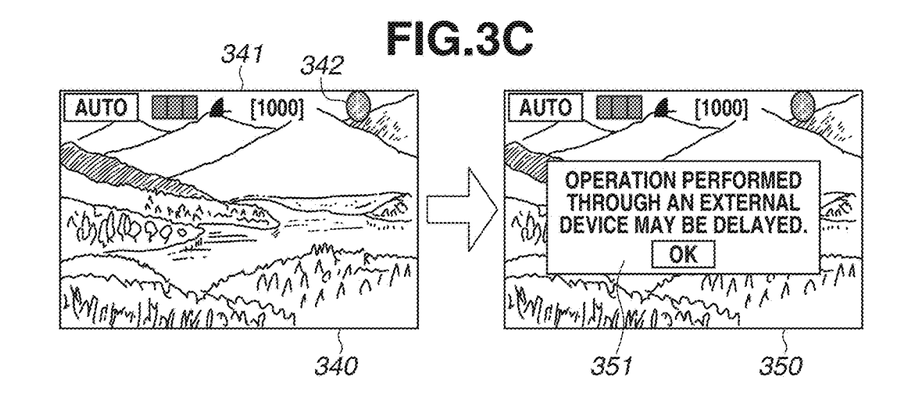

A screen 340 in FIG. 3C is an example of the GUI screen displayed on the display unit 106 in an imaging remote control mode of the digital camera 100. The screen 340 is displayed when the imaging remote control button 302 is selected at the mobile phone 200, so that the digital camera 100 is operated in the imaging remote control mode (remotely operated mode). Similar to the screen 330, the screen 340 also includes a mark 342 in addition to imaging information 341 indicating an imaging mode and a power state. A screen 350 is an example of the GUI screen for displaying a warning in the below-described imaging remote control mode, and a pop-up 351 that provides a warning message to the user is displayed thereon.

Figure 4:
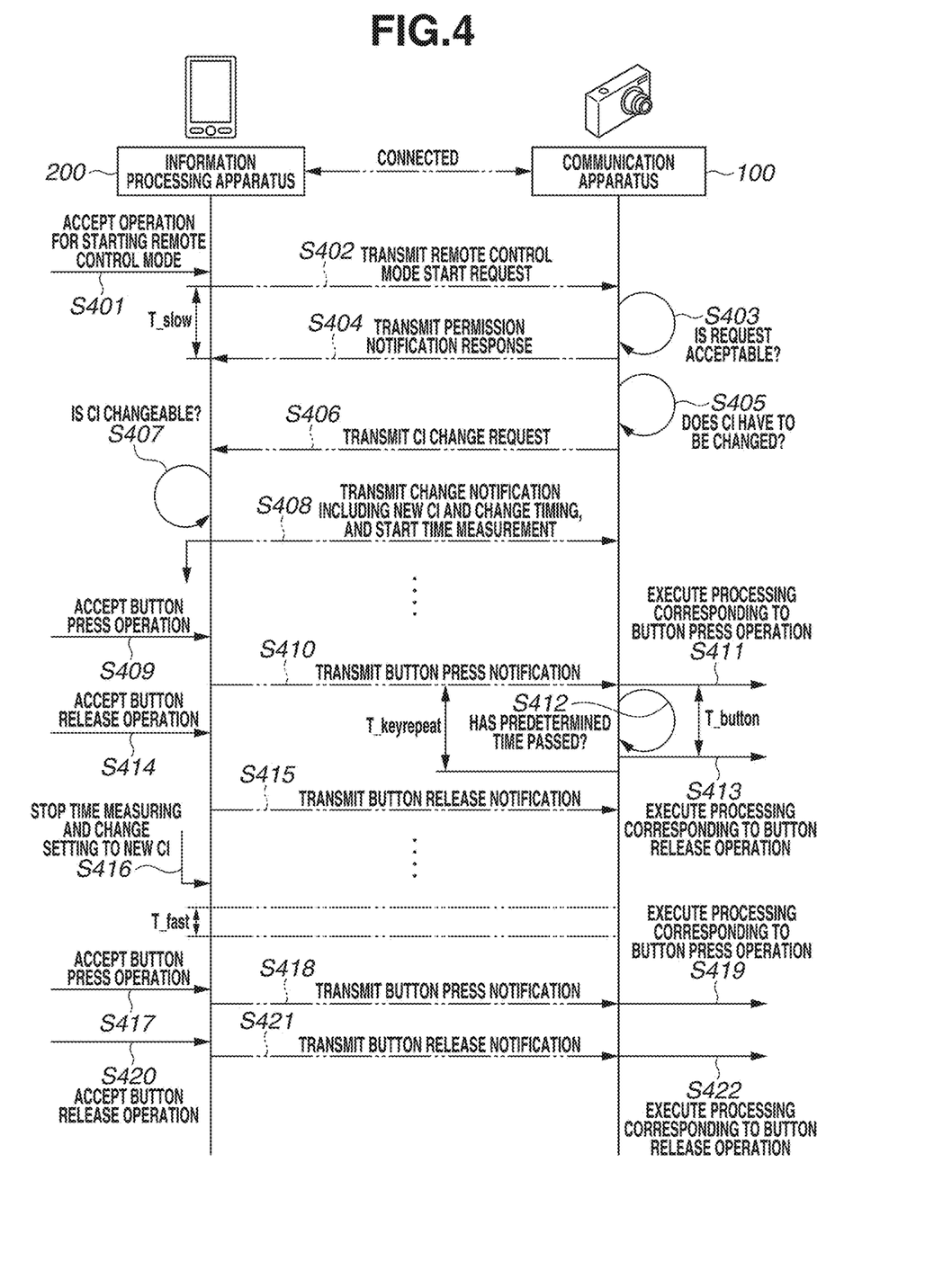
FIG. 4 is a sequence diagram illustrating an example of an operation sequence between the information processing apparatus and the communication apparatus according to the exemplary embodiment.

Next, a description will be provided with respect to a processing flow of remotely operating the digital camera 100 from the mobile phone 200 according to the present exemplary embodiment. FIG. 4 is a schematic diagram illustrating a sequence of remotely operating the digital camera 100 from the mobile phone 200 via the Bluetooth® (specifically, via the Bluetooth® Low Energy). FIG. 4 illustrates an example of a communication sequence between the digital camera 100 and the mobile phone 200 and operations to be executed thereby in order to execute the communication. In the digital camera 100, the sequence is executed by respective processing blocks including the short-range wireless communication unit 112 based on the control of the control unit 101. In the mobile phone 200, the sequence is executed by respective processing blocks including the short-range wireless communication unit 212 based on the control of the control unit 201.

First, in step S401, the control unit 201 of the mobile phone 200 determines that a request of starting operation in the remote control mode is accepted based on the user input via the operation unit 205. Next, in step S402, based on the request of starting operation in the remote control mode accepted in step S401, the control unit 201 controls the short-range wireless communication unit 212 to transmit a remote control mode start request to the digital camera 100. When the short-range wireless communication unit 112 of the digital camera 100 receives the request transmitted from the mobile phone 200, in step S403, the control unit 101 determines whether the request is acceptable.

If the control unit 101 determines that the request is acceptable (YES in step S403), the processing proceeds to step S404. In step S404, the control unit 101 controls the short-range wireless communication unit 112 to transmit a permission notification response to the mobile phone 200. The permission notification response is transmitted at a timing at which a data transmission/reception interval in the Bluetooth® Low Energy (herein, the connection interval (CI), i.e., "time interval T_slow") has passed after the remote control mode start request is transmitted in step S402. The CI is set to each of the short-range wireless communication units 112 and 212. Through the above processing, the digital camera 100 and the mobile phone 200 mutually shift to the remote control mode.

After the mode is shifted to the remote control mode, in step S405, the control unit 101 of the digital camera 100 determines whether the CI has to be changed because the data transmission/reception interval (CI=T slow) in the Bluetooth® Lowe Energy is longer than a predetermined time. If the control unit 101 determines that the CI has to be changed (YES in step S405), the processing proceeds to step S406. In step S406, the control unit 101 controls the short-range wireless communication unit 112 to transmit a change request (CI change request) for changing a period of the CI to the mobile phone 200. In the CI change request, the digital camera 100 can specify a desired value for the new CI. Herein, in order to improve the imaging response, the digital camera 100 specifies the CI to have a shorter interval.

In the present exemplary embodiment, it is assumed that the digital camera 100 and the mobile phone 200 are connected to each other before shifting to the remote control mode. Then, before the mode is shifted to the remote control mode, in order to reduce power consumption, a period of the CI is set to be longer than the CI specified after the mode is shifted to the remote control mode.

After the CI change request from the digital camera 100 is received via the short-range wireless communication unit 212, in step S407, the control unit 201 of the mobile phone 200 determines whether a period of the CI can be changed to the specified period. If the control unit 201 determines that the period thereof is changeable (YES in step S407), the processing proceeds to step S408. In step S408, the control unit 201 controls the short-range wireless communication unit 212 to transmit a change notification including a period of the CI to be changed (herein, "T_fast") and a timing of the change (herein, the timing of step S416) to the digital camera 100.

As described above, a timing of the change is notified in order to follow the Bluetooth® Low Energy standard. According to the Bluetooth® Low Energy standard, the mobile phone 200 should not instantly change the CI in response to the CI change request, but has to wait for a period equivalent to a period of a predetermined number of times (at least six times) of the previous CI (old CI) after the change notification is transmitted to the digital camera 100. Therefore, in addition to a value of the new CI, the change notification transmitted in step S408 includes the timing of step S416, i.e., a timing at which the old CI having a long interval before making change is repeated for six times, is included as a timing of changing the CI to the new CI. In step S408, in addition to transmitting the change notification, the control unit 201 also starts time measurement in order to determine whether a period equivalent to the period in which the old CI is repeated for a predetermined number of times has passed.

As described above, even if the mobile phone 200 has determined to change the CI based on the CI change request, the operation is continuously executed with the old CI for a predetermined period. Therefore, there is a case where the digital camera 100 accepts a button operation request from the mobile phone 200 before the change of the CI is completed. The operation to be executed in the above-described case will be described below.

First, in step S409, if the user of the mobile phone 200 performs a button press operation through the operation unit 205, the control unit 201 of the mobile phone 200 detects the button press operation executed by the user. Then, in step S410, the control unit 201 controls the short-range wireless communication unit 212 to transmit a notification (button press notification) indicating the acceptance of the button press operation to the digital camera 100. For example, the button press notification includes information for specifying a button as a control target and operation information (herein, a press instruction) with respect to the button. If a number of buttons as operation targets is more than one, a status of each of the buttons can be collectively included in the button press notification. For example, with respect to the operation screen such as the screen 310 in FIG. 3A, the information indicating the on/off status of each of the buttons displayed on the screen can be included in the button press notification.

When the control unit 101 of the digital camera 100 receives the button press notification from the mobile phone 200 via the short-range wireless communication unit 112, in step S411, the control unit 101 internally issues an operation event for the button corresponding to the notification and executes processing corresponding to the operation event. The control unit 101 executes the above corresponding processing in concurrent with subsequent steps. With this processing, a pressed state of the button is continued in the digital camera 100.

While the corresponding processing is being executed (i.e., while the pressed state is being continued), in step S412, the control unit 101 measures the elapsed time and determines whether a predetermined time (T button) has passed. If the control unit 101 determines that the predetermine time has passed (YES in step S412), the processing proceeds to step S413. In step S413, the control unit 101 issues an operation event for cancelling the pressed state of the button and releasing the button that is the same as the button on which the press operation is executed in step S411. The pressed state of the button is cancelled even if a button release notification from the mobile phone 200 is not received.

Herein, if the pressed state of the button is continued over a predetermined time, the control unit 101 determines that the button is brought into a long-pressed state and reissue the corresponding operation event based on the duration of time. Therefore, the operation event is issued repeatedly. In the present exemplary embodiment, such repetition of the same operation event is referred to as "key repeat". As described above, if the pressed state of the button is not cancelled, but continued to cause the key repeat to occur, there is a risk in which the operation different from the operation intended by the user is executed by the digital camera 100.

For example, there is a case where the user of the mobile phone 200 performs a tap operation on the screen 310, i.e., an operation of moving the finger away from the screen immediately after touching the screen with the finger. In this case, the control unit 201 consecutively accepts the button press operation in step S409 and the button release operation in step S414 as illustrated in FIG. 4. If a notification timing with respect to the digital camera 100 has not come when the button release operation is accepted, only the button press notification based on the button press operation is transmitted at a notification timing that has come earlier.

In order to transmit the button release notification based on the button release operation accepted immediately after the button press operation, the mobile phone 200 waits for the next communication timing after passage of the CI. Herein, because the user just tapped the screen of the mobile phone 200, the user expects the digital camera 100 to promptly execute the operation corresponding to the button release operation after executing the operation corresponding to the button press operation. However, if a length of the CI set at this point of time is longer than a predetermined time, the digital camera 100 cannot receive the button release notification even if the predetermined time has passed after receiving the button press notification.

In the present exemplary embodiment, a key repeat time T_keyrepeat, i.e., a time reference for determining whether to execute the key repeat of the button operation, is regarded as the predetermined time. In this case, the control unit 101 determines that the button is continuously pressed, so as to execute the key repeat operation. Thus, the operation is different from the operation expected by the user.

In the present exemplary embodiment, after receiving the button press notification, the control unit 101 automatically issues the operation event for the button release operation in step S413 before the key repeat time T_keyrepeat has passed, so that the operation expected by the user can be realized while avoiding the key repeat operation. Accordingly, the predetermined time T button has to be shorter than a time interval of the key repeat T_keyrepeat which the control unit 101 uses as a reference to determine whether the button press operation is a long-press operation or a repetitive operation (T_keyrepeat>T_button).

Next, in step S414, based on the user operation performed on the operation unit 205, if the control unit 201 of the mobile phone 200 detects a button release operation of the button in the pressed state, the processing proceeds to step S415. In step S415, the control unit 201 controls the short-range wireless communication unit 212 to transmit a notification (button release notification) indicating acceptance of the button release operation to the digital camera 100. For example, the button release notification includes information for specifying a button as a control target and operation information (herein, a release instruction) with respect to the button.

Similar to the case of the button press notification, if a number of buttons as the operation targets is more than one, a status of each of the buttons can be collectively included in the button release notification. While the control unit 101 of the digital camera 100 receives the button release notification from the mobile phone 200 via the short-range wireless communication unit 112, the control unit 101 does not particularly execute additional processing because the pressed state of the button has already been cancelled by the digital camera 100.

Even while the above-described processing is being continued, based on the time measurement started in step S408, the control unit 201 monitors whether a period equivalent to a predetermined number of times of the old CI has passed. If the control unit 201 determines that the predetermined time has passed, in step S416, the control unit 201 changes a setting of the transmission/reception timing of the short-range wireless communication unit 212 to the new CI. At this time, the control unit 101 of the digital camera 100 also changes a setting of the transmission/reception timing of the short-range wireless communication unit 112 to the new CI. The CI set at this point of time is represented by a time interval "T_fast", and satisfies a relationship of "T_slow>T_keyrepeat>T_fast".

Thereafter, communication between the digital camera 100 and the mobile phone 200 based on the Bluetooth® Low Energy standard is executed at a time interval of "CI=T_fast". Therefore, in step S417, if the control unit 201 determines that the button press operation is accepted from the user via the operation unit 205 of the mobile phone 200, the processing proceeds to step S418. In step S418, the control unit 201 controls the short-range wireless communication unit 212 based on the time interval CI=T_fast and transmits the button press notification to the digital camera 100. When the control unit 101 of the digital camera 100 receives the button press notification from the mobile phone 200 via the short-range wireless communication unit 112, in step S419, the control unit 101 internally issues the operation event for the button corresponding to the notification and executes processing corresponding to the operation event. At this time, the data transmission/reception time interval CI between the digital camera 100 and the mobile phone 200 is changed to the time interval T_fast that is shorter than the key repeat time T_keyrepeat. Therefore, measurement of elapsed time executed in step S412 or issuance of an internal event for the button release operation in step S413 does not have to be executed.

In step S420, if the control unit 201 determines that the button release operation is accepted from the user via the operation unit 205 of the mobile phone 200, the processing proceeds to step S421. In step S421, the control unit 201 controls the short-range wireless communication unit 212 based on the time interval of CI=T_fast and transmits the button release notification to the digital camera 100. When the control unit 101 of the digital camera 100 receives the button release notification from the mobile phone 200 via the short-range wireless communication unit 112, in step S422, the control unit 101 internally issues the operation event for the button corresponding to that notification and executes processing corresponding to the operation event.

As described above, when the digital camera 100 is remotely operated from the mobile phone 200 via the Bluetooth® Low Energy, the digital camera 100 can prevent a situation in which the operation different from the intention of the user is executed because of the long interval set as the CI.

For illustrative purposes, communication between the digital camera 100 and the mobile phone 200 in which a response is not necessary with respect to a notification ("write without response") has been illustrated in FIG. 4. In this case, it is sufficient if the conditions "T_slow>T_keyrepeat>T_button" and "T_keyrepeat>T_fast" are satisfied. In a case where a response has to be returned with respect to the received notification ("write with response"), the digital camera 100 has to stand ready for a period equivalent to the CI in order to execute communication only for the purpose of transmitting the response. In such a case, different conditions such as "T_slow×2>T_keyrepeat>T_button" and "T_keyrepeat>T_fast×2" are applied with respect to the time intervals T_slow and T_fast.

In the exemplary embodiment illustrated in FIG. 4, even if the button press operation is continuously detected by the mobile phone 200, the mobile phone 200 transmits the button press notification only once at a timing at which the button press operation is first detected. As another exemplary embodiment, for example, while the button press operation is being continuously detected, the control unit 201 can control the short-range wireless communication unit 212 based on the time interval of the CI and transmit the button press notification to the digital camera 100.

In FIG. 4, while the key repeat time (T_keyrepeat) is constant, the key repeat time can be individually set with respect to each button. Alternatively, a different key repeat time can be applied to each screen. In such a case, the new CI is set based on a key repeat time having the strictest condition (i.e., the shortest key repeat time T_keyrepeat_min).

In FIG. 4, while the digital camera 100 executes processing of suppressing the key repeat by internally issuing the button release operation event in step S413, there can be a case where the button release notification is not transmitted at a timing of step S415. In such a case, there is a high possibility that the user continuously presses the button (i.e., a touched state of the screen is continued), so that the control unit 101 reissues the operation event for the button press operation. By reissuing the operation event, the control unit 101 suppresses the execution of time measurement in step S412 and issuance of the operation event for the button release operation in step S413. Then, the control unit 101 issues the operation event for the button release operation when the button release notification from the mobile phone 200 is received. With this processing, it is possible to execute the operation closer to the operation desired by the user. After the new CI is set thereto, in order to reduce the power consumption, the CI can be extended again at a timing at which the remote control mode ends or the power is turned off.

Figure 5:
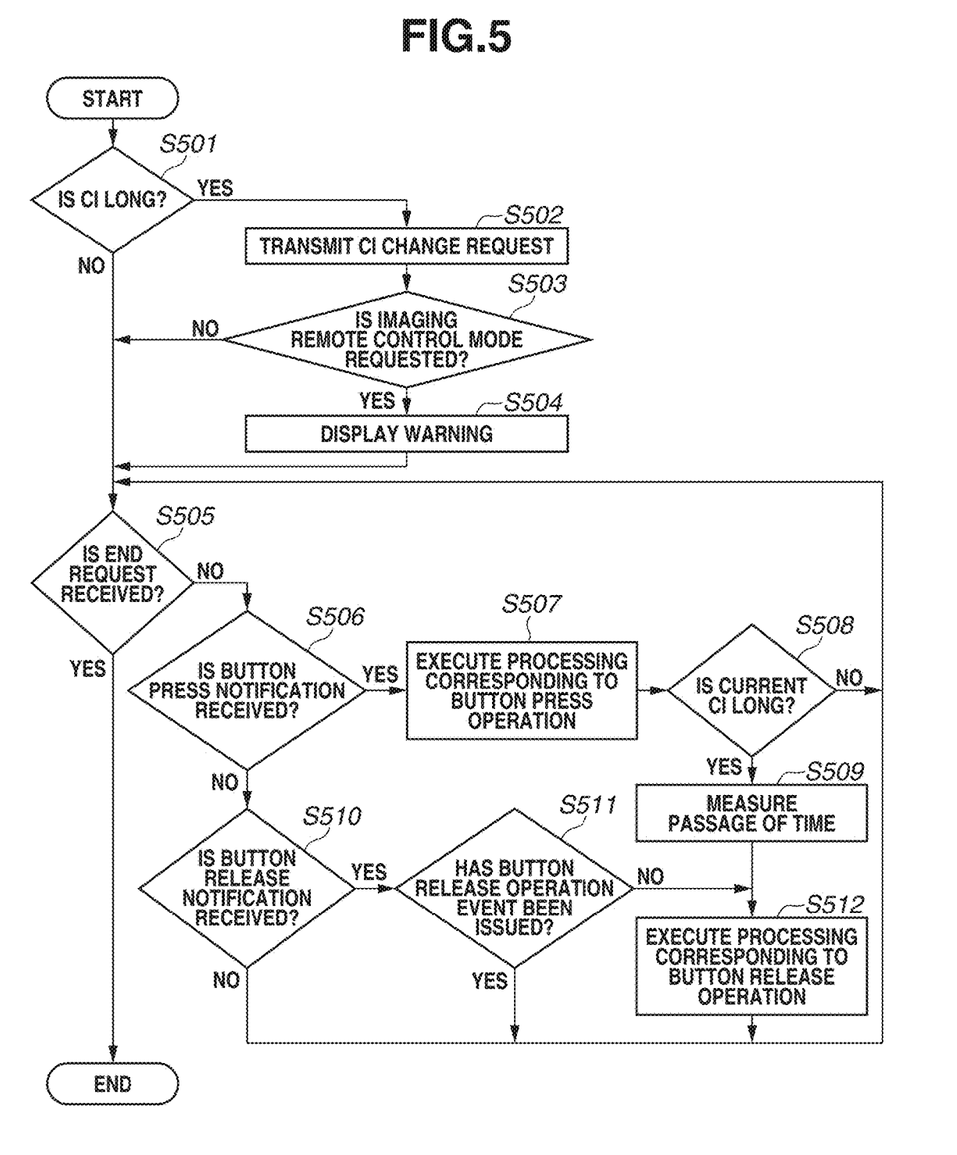
FIG. 5 is a flowchart illustrating an example of an operation of the communication apparatus according to the exemplary embodiment.

Next, a description will be provided with respect to the operation of the digital camera 100 serving as a communication apparatus in the remote control mode, which corresponds to the operation sequence illustrated in FIG. 4. FIG. 5 is a flowchart illustrating an example of the operation of the digital camera 100 in the remote control mode. The control unit 101 of the digital camera 100 controls each unit of the digital camera 100 based on an input signal or a program stored in the non-volatile memory 103, so as to realize the processing illustrated in the flowchart. The processing in FIG. 5 is started when the digital camera 100 and the mobile phone 200 have mutually shifted to the remote control mode after the digital camera 100 transmits a permission notification response (corresponding to step S404 in FIG. 4) with respect to the instruction for starting the remote control mode received from the mobile phone 200 as a connected device (corresponding to step S402 in FIG. 4).

In step S501, the control unit 101 determines whether a length of the CI currently set as a communication interval of the short-range wireless communication unit 112 is long for the digital camera 100 to operate in the remote control mode based on the remote operation from the mobile phone 200. Although a determination reference of the length of the CI depends on each device, as illustrated in FIG. 4, a length of time taken to receive the button release notification after receiving the button press notification is set to be shorter than a length of time (key repeat time) taken to determine the button press operation as the key repeat. In a case where the same operation button is continuously operated, the key repeat time is used as a reference for determining that the operation is not a single input but a continuous input. In addition, the key repeat time can have a different value for each of the operation buttons.

Therefore, the control unit 101 compares a minimum value of the key repeat time T_keyrepeat_min of the possible time lengths of the key repeat time T_keyrepeat with a length Tci of the CI currently set thereto. If a condition of "Tci≥T_keyrepeat_min" is satisfied, the control unit 101 can determine that the length Tci is long for operating in the remote control mode. On the other hand, if a condition of "Tci<T_keyrepeat_min" is satisfied, the control unit 101 determines that the length Tci is not long for operating in the remote control mode. If the control unit 101 determines that the length Tci is long for operating in the remote control mode (YES in step S501), the processing proceeds to step S502. If the control unit 101 determines that the length Tci is not long for operating in the remote control mode (NO in step S501), the processing proceeds to step S505.

In step S502, the control unit 101 transmits a change request of the time of the CI (corresponding to the CI change request in step S406) to the mobile phone 200 via the short-range wireless communication unit 112. Next, in step S503, the control unit 101 determines whether the requested remote control mode is the imaging remote control mode. In the present exemplary embodiment, as described with reference to FIGS. 3A to 3C, the playback remote control mode and the imaging remote control mode are provided as the operation modes of the digital camera 100. Accordingly, information for specifying the operation mode is included in the remote control mode start request transmitted from the mobile phone 200. Therefore, based on the operation mode specified by the remote control mode start request, if the control unit 101 determines that the remote control mode request is a request of the imaging remote control mode (YES in step S503), the processing proceeds to step S504. If the remote control mode request is determined as a request of the playback remote control mode (NO in step S503), the processing proceeds to step S505.

In step S504, the control unit 101 displays a warning (pop-up 351) as illustrated in the screen 350 in FIG. 3C on the display unit 106 and notifies the user that the imaging timing may be delayed. Subsequently, in step S505, the control unit 101 determines whether the short-range wireless communication unit 112 receives a request of ending the remote control mode from the mobile phone 200. If the control unit 101 determines that the end request is received (YES in step S505), the control unit 101 ends the remote control mode. If the end request is not received (NO in step S505), the processing proceeds to step S506.

In step S506, the control unit 101 determines whether the short-range wireless communication unit 112 receives the button press notification. If the control unit 101 determines that the button press notification is received (YES in step S506), the processing proceeds to step S507. If the control unit 101 determines that the button press notification is not received (NO in step S506), the processing proceeds to step S510.

In step S507, the control unit 101 internally issues the operation event of the button specified by the button press notification and executes processing corresponding to the operation event. For example, if the received button press notification is a press notification of the switch SW1 based on the touch operation of the AF button 323 in the screen 320 illustrated in FIG. 3A, the control unit 101 executes the AF processing, the AE processing, the AWB processing or the EF processing to execute imaging preparations.

Next, in step S508, the control unit 101 compares the length Tci of the CI set at the time of determination in step S508 to the shortest key repeat time T_keyrepeat_min and determines whether the condition "Tci≥T_keyrepeat_min" is satisfied, so as to determine whether the current CI is long. If the condition "Tci≥T_keyrepeat_min" is satisfied, and the control unit 101 determines that the current CI is long (YES in step S508), the processing proceeds to step S509. If the condition "Tci<T_keyrepeat_min" is satisfied, and the control unit 101 determines that the current CI is not long (NO in step S508), the processing returns to step S505.

In step S509, the control unit 101 measures the elapsed time after receiving the button press notification in step S506 (or after executing the button press operation in step S507). When the control unit 101 determines that a predetermined time (corresponding to the predetermined time T_button in FIG. 4) has passed, the processing proceeds to step S512. In step S512, the control unit 101 issues the operation event for cancelling the pressed state of the button that is the same as the button on which the press operation is executed in step S507 to release the button, and the processing returns to step S505.

In step S510, the control unit 101 determines whether the short-range wireless communication unit 112 receives the button release notification. If the control unit 101 determines that the button release notification is received (YES in step S510), the processing proceeds to step S511. If the control unit 101 determines that the button release notification is not received (NO in step S510), the processing returns to step S505. In step S511, the control unit 101 determines whether the control unit 101 has already issued an operation event for cancelling the pressed state of the button that is the same as the button on which the press operation is executed in step S507 to release the button. If the control unit 101 determines that the button release operation event has been issued (YES in step S511), the processing returns to step S505. If the control unit 101 determines that the button release operation event has not been issued (NO in step S511), the processing proceeds to step S512, so that the control unit 101 executes the processing previously described.

In the flowchart of FIG. 5, in step S508, with respect to an arbitrary button corresponding to the accepted button press notification, the control unit 101 executes determination whether the current CI is long. However, the present exemplary embodiment is not limited to the above, and the control unit 101 can execute the determination only when the button press notification of a particular button is accepted. In this case, after the processing is executed in step S507, the processing returns to step S505. A type of a button, an operation of which is determined as "key repeat" when the press operation is continued for a period longer than a predetermined time, is regarded as the particular button.

For example, the key repeat is executed on a zoom operation button in a case where the user continuously presses the zoom operation button in the imaging remote control mode because enlargement and reduction operations are executed consecutively. In a case where the user desires to make a fine adjustment of a zoom, the user can shorten the operation time of the zoom operation button as much as possible in order to make an adjustment individually. In such a case, if the key repeat that is not intended by the user is executed because of the long CI, operability of the user is considerably degraded. Therefore, the control unit 101 can regard the zoom operation button as the particular button to execute the processing in step S508.

The user can switch the images replayed and displayed by the digital camera 100 by operating the up/down/right/left buttons in the playback remote control mode. If the up/down/right left operation buttons are continuously pressed, key repeat is executed because displayed images are consecutively switched. In a case where the user would like to switch the replayed images one by one, the user can shorten the operation time in order that the images are switched one by one. Therefore, the control unit 101 can regard the up/down/right/left buttons as the particular buttons to execute the processing in step S508. As described above, with respect to a predetermined operation in which the operation corresponding to the press operation is executed singularly or repeatedly based on the continuity of the accepted press operation, the processing in step S508 can be executed.

With respect to a button the operation of which is not determined as the key repeat even if the button is continuously pressed, the processing in step S508 can be omitted because a negative effect of the key repeat will not occur. For example, even if a SET button or a cancel button is continuously pressed, the function corresponding to that button is not consecutively executed.

In step S504, while a warning as illustrated in the screen 350 is displayed in the imaging remote control mode, a timing of displaying the warning can be changed depending on the imaging mode or the imaging environment. For example, with respect to the imaging mode, the warning can be displayed when a mode of the AF is changed to the continuous AF mode, i.e., a mode for continuously focusing on an object while the switch SW1 is being operated continuously.

With respect to the imaging environment, the warning can be displayed when it is determined that the object is largely moving or a user who captures the image is moving rapidly based on differences between frames.

In the above-described situations, it is assumed that the imaging timing is severe because the user will miss the imaging opportunity if the digital camera 100 executes the operation different from the operation intended by the user. Therefore, the warning can be displayed only in the above-described situations. In this case, the control unit 101 detects the movement of the object and determines whether a moving amount of the object per unit time is a predetermined amount or more, and determines that the object is moving excessively if the moving amount is the predetermined amount or more. The warning is not displayed when the operation which does not require a severe imaging timing, e.g., imaging of a still object, is executed, so that it is possible to avoid bothering the user with the unnecessary warning.

In step S504, while the warning in a text form is displayed on the screen 350 in the imaging remote control mode, a predetermined warning mark can be displayed on a screen of the digital camera 100 instead of displaying a warning screen using text. In this case, the warning mark is continuously superimposed and displayed on the screen when the condition "Tci≥T_keyrepeat_min" is satisfied. The mark is hidden when the CI time is changed, and the control unit 101 determines that the condition "Tci<T_keyrepeat_min" is satisfied in step S508. By displaying the warning mark, the user can be explicitly made aware of a period having a delay in the button operation.

It is often the case that the user stays away from the digital camera 100 when the operation is performed in the remote control mode. Therefore, a warning pop-up or a warning mark can be also displayed on the screen of the mobile phone 200. In this case, in step S504, the digital camera 100 transmits a signal instructing the mobile phone 200 to display the warning pop-up or the warning mark. Then, the mobile phone 200 that receives the signal controls the display unit 206 to display the warning pop-up or the warning mark.

In the above-described exemplary embodiment, the user selects the imaging remote control mode or the playback remote control mode through the mobile phone 200, so that the digital camera 100 is operated based on the selection. However, a display screen of the mobile phone 200 can automatically be switched based on the operation mode of the digital camera 100. At this time, the user can operate the screen of the mobile phone 200 to shift the operation mode from the imaging remote control mode to the replay remote control mode, or from the replay remote control mode to the imaging remote control mode. With this configuration, the use does not have to select the operation mode every time the user requests start of the remote control mode.

Figure 6:
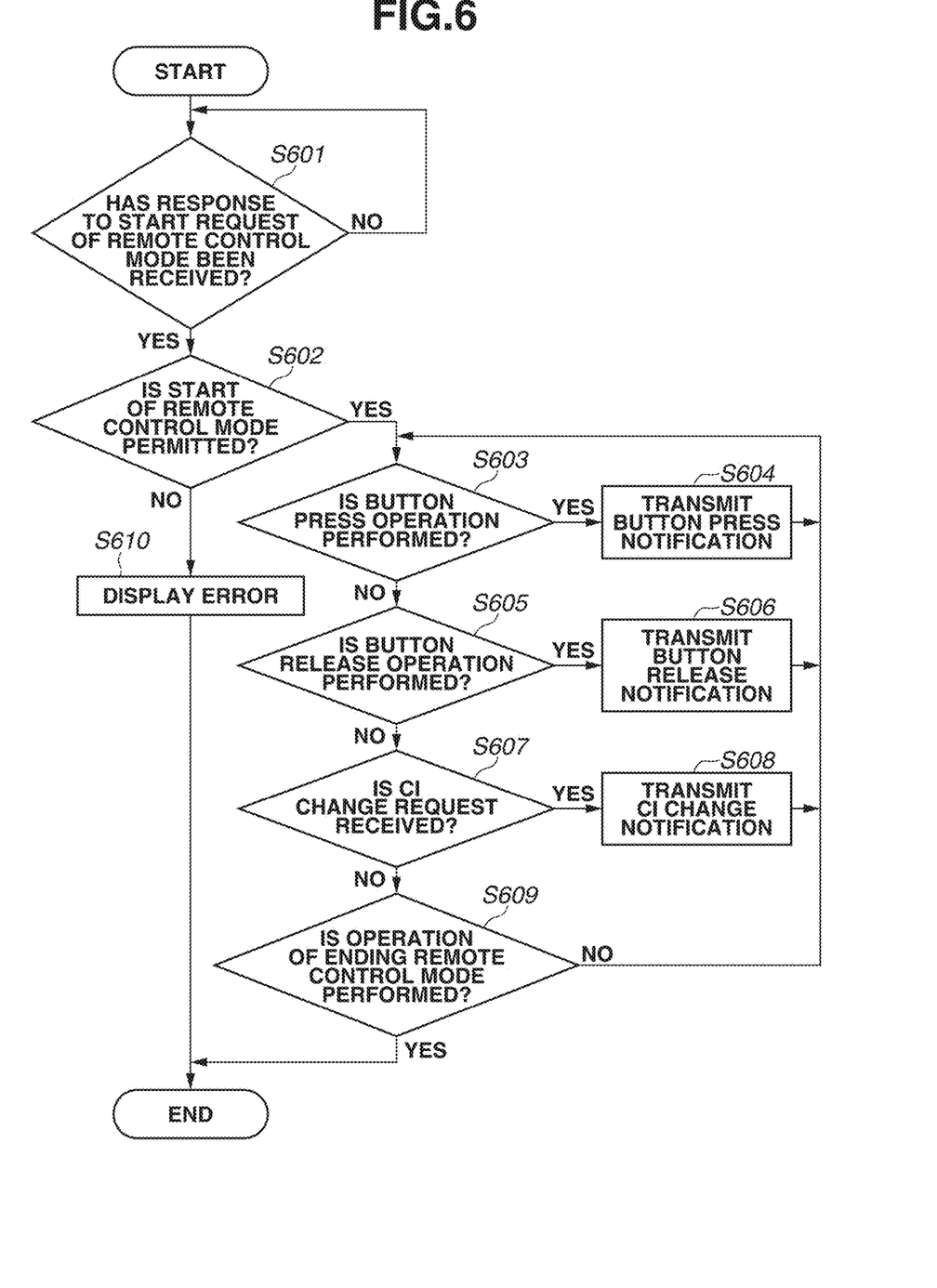
FIG. 6 is a flowchart illustrating an example of an operation of the information processing apparatus according to the exemplary embodiment.

Next, description will be provided with respect to the operation of the mobile phone 200 serving as an information processing apparatus in the remote control mode, which corresponds to the operation sequence illustrated in FIG. 4. FIG. 6 is a flowchart illustrating an example of an operation of the mobile phone 200 in the remote control mode. The control unit 201 of the mobile phone 200 controls each unit of the mobile phone 200 based on an input signal or a program stored in the non-volatile memory 203, so as to realize the processing illustrated in the flowchart. The processing illustrated in the flowchart in FIG. 6 is started when the mobile phone 200 transmits the remote control mode start request to the digital camera 100 as a connection device (i.e., corresponding to step S402 in FIG. 4) based on the user's instruction of starting the remote control mode.

First, in step S601, the control unit 201 determines whether a response to a start request of the remote control mode is received. When the control unit 201 determines that the short-range wireless communication unit 212 receives the response from the digital camera 100 (YES in step S601), the processing proceeds to step S602. In step S602, the control unit 201 determines whether start of the remote control mode is permitted. If the control unit 201 determines that start of the remote control mode is permitted (YES in step S602), the processing proceeds to step S603. If the control unit 201 determines that start of the remote control mode is not permitted (NO in step S602), the processing proceeds to step s610. In step S610, the control unit 201 displays an error on the display unit 206 and ends the processing.

Next, in step S603, the control unit 201 determines whether the button press operation is performed through the operation unit 205. If the control unit 201 determines that the button press operation is performed (YES in step S603), the processing proceeds to step S604. If the control unit 201 determines that the button press operation is not performed (NO in step S603), the processing proceeds to step S605. In step S604, the control unit 201 transmits the button press notification for requesting the button press operation to the digital camera 100 via the short-range wireless communication unit 212. Thereafter, the processing returns to step S603.

In step S605, the control unit 201 determines whether the button release operation is performed through the operation unit 205. If the control unit 201 determines that the operation is performed (YES in step S605), the processing proceeds to step S606. If the control unit 201 determines that the operation is not performed (NO in step S605), the processing proceeds to step S607. In step S606, the control unit 201 transmits the button release notification for requesting the button release operation to the digital camera 100 via the short-range wireless communication unit 212. Thereafter, the processing returns to step S603.

In step S607, the control unit 201 determines whether the CI change request for changing the time of the CI is received from the digital camera 100 via the short-range wireless communication unit 212. If the control unit 201 determines that the CI change request is received (YES in step S607), the processing proceeds to step S608. If the control unit 201 determines that the CI change request is not received (NO in step S607), the processing proceeds to step S609. In step S608, the control unit 201 transmits the CI change notification that includes the CI time and information about the actual changing timing corresponding to the request to the digital camera 100 via the short-range wireless communication unit 212 while taking system restriction (e.g., a time range) of the mobile phone 200 into consideration.

In step S609, the control unit 201 determines whether an operation of ending the remote control mode is performed through the operation unit 205. If the control unit 201 determines that the ending operation is not performed (NO in step S609), the processing returns to step S603. If the control unit 201 determines that the ending operation is performed (YES in step S609), the processing ends.

As described above, according to the present exemplary embodiment, after the digital camera 100 has issued the CI change request, the button release operation with respect to the button press operation received by the digital camera 100 before the CI time is actually changed is independently executed by the digital camera 100. With this configuration, the key repeat will not occur unnecessarily, and the key repeat operation that is not expected by the user can be prevented from being executed. According to the present exemplary embodiment, the warning is displayed in the imaging remote control mode in which a delay caused by the CI time has a negative effect on the button operation, so that a possibility of the user failing in a desired imaging operation can be reduced.

While exemplary embodiments have been described, these exemplary embodiments are not seen to be limiting. Variations that do not depart from the essential spirit of the exemplary embodiments are applicable. Part of the above-described exemplary embodiments can be combined as appropriate.

Exemplary embodiments also include a configuration in which a program of software that realizes the functions of the above-described exemplary embodiment is supplied directly from a storage medium or through wired/wireless communication to a system or an apparatus that includes a computer capable of executing the program, so that the program is executed by the computer included in the system or the apparatus. Accordingly, a program code itself, which is supplied to or installed in the computer can realize functional processing of the exemplary embodiments. In this case, the computer program of any form, e.g., an object code, a program executed by an interpreter, or script data supplied to the OS, can be included as long as functions of the computer program can be provided thereby. For example, a hard disk, a magnetic storage medium such as a magnetic tape, an optical or a magneto optical storage medium, or a non-volatile semiconductor memory can be used as a storage medium for supplying the program. The program can be supplied through a method in which a computer program that implements the exemplary embodiments is stored in a server on a computer network, and a client computer that is connected thereto downloads the computer program to execute programming.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110351, filed Jun. 1, 2016, which is hereby incorporated by reference herein in its entirety.

What is claimed is:

1. A communication apparatus that communicates with an external apparatus to accept a remote operation from the external apparatus comprising:
   a setting unit configured to set a time interval with respect to a timing of communicating with the external apparatus;
   a communication unit configured to communicate with the external apparatus at the time interval set by the setting unit; and
   a control unit configured to perform control to, based on a request of an operation through the remote operation received from the external apparatus, communicate with the external apparatus in one of a plurality of modes including a remotely operated mode in which an operation corresponding to a requested operation is executed,
   wherein, in a case where a mode is shifted to the remotely operated mode, the setting unit changes the time interval to a shorter interval, and the control unit performs control to notify a user that the time interval is a long interval until a change of the time interval is completed.

2. The communication apparatus according to claim 1,
wherein, in a case where a first time interval has passed without accepting a request of cancelling the operation from the external apparatus after the communication unit accepts the request of the operation through the remote operation received from the external apparatus, the control unit executes the operation corresponding to the requested operation again,
wherein, in a case where a request of cancelling the operation is accepted before the first time interval has passed, the control unit cancels an operated state, and
wherein, in a case where the time interval set by the setting unit is longer than the first time interval, the control unit performs control not to execute the operation corresponding to the requested operation again even if the first time interval has passed without receiving the request of cancelling the operation from the external apparatus.

3. The communication apparatus according to claim 2, wherein, in a case where the first time interval has passed without accepting a request of cancelling the operation from the external apparatus in a state where the time interval set by the setting unit is shorter than the first time interval, the control unit executes the operation corresponding to the requested operation again.

4. The communication apparatus according to claim 3, wherein, after the operation corresponding to the requested operation is executed again, the control unit does not execute the operation corresponding to the requested operation again until a request of cancelling the operation from the external apparatus is accepted.

5. The communication apparatus according to claim 2,
wherein, with respect to a plurality of operations which the communication apparatus can accept through the remote operation, a duration time for repeatedly executing a corresponding operation in a case where the operation is continued is set individually, and
wherein the first time interval is a time interval corresponding to the operation having a shortest duration time from among the plurality of operations which the communication apparatus can accept through the remote operation.

6. The communication apparatus according to claim 2, wherein, in a case where an operation which the remote operation is accepted from the external apparatus is not a predetermined operation, the control unit performs control not to execute the operation corresponding to the requested operation again regardless of a relationship between the time interval set by the setting unit and the first time interval.

7. The communication apparatus according to claim 6, wherein the predetermined operation is an operation of switching whether to execute an operation corresponding to the predetermined operation singularly or repeatedly based on continuity of the accepted operation.

8. The communication apparatus according to claim 2 further comprising:
a determination unit configured to determine whether the time interval set by the setting unit is longer than the first time interval,
wherein, in a case where the determination unit determines that the set time interval is longer than the first time interval, the communication unit transmits a request of changing the time interval to the external apparatus and receives a response to the request from the external apparatus, and
wherein the setting unit changes a setting to a second time interval that is shorter than the first time interval based on the response from the external apparatus.

9. The communication apparatus according to claim 8, wherein, in a case where the communication unit transmits the request of changing the time interval, the control unit controls a display unit to display a notification for notifying a delay in a response with respect to the remote operation to a user of the communication apparatus.

10. The communication apparatus according to claim 1 further comprising a display unit configured to display an image, wherein the request of the operation is a request with respect to image display executed by the display unit.

11. The communication apparatus according to claim 1 further comprising an imaging unit configured to image an object, wherein the request of the operation is a request with respect to imaging executed by the imaging unit.

12. The communication apparatus according to claim 11,
wherein the imaging unit executes auto-focus processing,
wherein the control unit can change a setting of the auto-focus processing,
wherein, in a case where a mode is shifted to the remotely operated mode in a state where the auto-focus processing is set to a continuous auto-focus mode, the setting unit changes the time interval to a shorter interval, and the control unit controls the communication apparatus to notify a user that the time interval is a long interval until a change of the time interval is completed, and
wherein, in a case where a mode is shifted to the remotely operated mode in a state where the auto-focus processing is not set to the continuous auto-focus mode, the setting unit changes the time interval to a shorter interval, and the control unit performs control not to notify a user that the time interval is a long interval until a change of the time interval is completed.

13. The communication apparatus according to claim 11,
wherein, in a case where a mode is shifted to the remotely operated mode and movement of the object is detected, the setting unit changes the time interval to a shorter interval, and the control unit controls the communication apparatus to notify a user that the time interval is a long interval until a change of the time interval is completed, and
wherein, in a case where a mode is shifted to the remotely operated mode and movement of the object is not detected, the setting unit changes the time interval to a shorter interval, and the control unit performs control not to notify a user that the time interval is a long interval until a change of the time interval is completed.

14. The communication apparatus according to claim 11,
wherein, in a case where a mode is shifted to the remotely operated mode in a state where the communication apparatus is moving, the setting unit changes the time interval to a shorter interval, and the control unit controls the communication apparatus to notify a user that the time interval is a long interval until a change of the time interval is completed, and
wherein, in a case where a mode is shifted to the remotely operated mode in a state where the communication apparatus is not moving, the setting unit changes the time interval to a shorter interval, and the control unit performs control not to notify a user that the time interval is a long interval until a change of the time interval is completed.

15. An information processing apparatus that remotely operates an imaging apparatus comprising:

a communication unit configured to wirelessly communicate with the imaging apparatus at a time interval set by the imaging apparatus;

an operation unit configured to accept a user operation; and a control unit configured to perform control to communicate with the imaging apparatus in one of a plurality of modes including a remote operation mode for remotely operating the imaging apparatus based on an operation input to the information processing apparatus, wherein, in a case where communication is executed with the imaging apparatus in the remote operation mode, the time interval is changed to a shorter interval, and the control unit performs control to notify a user that the time interval is a long interval until a change of the time interval is completed.

16. A control method of a communication apparatus that communicates with an external apparatus to accept a remote operation from the external apparatus, the control method comprising:

setting a time interval with respect to a timing of communicating with the external apparatus;

communicating with the external apparatus at the set time interval;

performing control to, based on a request of an operation through the remote operation received from the external apparatus, communicate with the external apparatus in one of a plurality of modes including a remotely operated mode in which an operation corresponding to a requested operation is executed; and notifying a user that the time interval is a long interval until a change of the time interval is completed, while the time interval is changed to a shorter interval in a case where a mode is shifted to the remotely operated mode.

17. A control method of an information processing apparatus remotely operating an imaging apparatus, the control method comprising:

wirelessly communicating with the imaging apparatus at a time interval set by the imaging apparatus;

accepting a user operation;

performing control to communicate with the imaging apparatus in one of a plurality of modes including a remote operation mode for remotely operating the imaging apparatus based on an operation input to the information processing apparatus, and changing, in a case where communication is executed with the imaging apparatus in the remote operation mode, the time interval to a shorter interval and performing control to notify a user that the time interval is a long interval until a change of the time interval is completed.

18. A non-transitory computer-readable storage medium that stores computer executable instructions for causing a computer to execute a control method of a communication apparatus that communicates with an external apparatus to accept a remote operation from the external apparatus, the control method comprising:

setting a time interval with respect to a timing of communicating with the external apparatus;

communicating with the external apparatus at the set time interval;

performing control to, based on a request of the operation through the remote operation received from the external apparatus, communicate with the external apparatus in one of a plurality of modes including a remotely operated mode in which an operation corresponding to a requested operation is executed; and changing, in a case where a mode is shifted to the remotely operated mode, the time interval to a shorter interval and performing control to notify a user that the time interval is a long interval until a change of the time interval is completed.

19. A non-transitory computer-readable storage medium that stores computer readable instructions for causing a computer to execute a control method of an information processing apparatus that remotely operates an imaging apparatus, the control method comprising:

wirelessly communicating with the imaging apparatus at a time interval set by the imaging apparatus;

accepting a user operation;

performing control to communicate with the imaging apparatus in one of a plurality of modes including a remote operation mode for remotely operating the imaging apparatus based on an operation input to the information processing apparatus; and changing, in a case where communication is executed with the imaging apparatus in the remote operation mode, the time interval to a shorter interval and performing control to notify a user that the time interval is a long interval until a change of the time interval is completed.

* * * * *